July 28, 1936.  R. H. WHITELEY  2,048,763
SELF LUBRICATING UNIVERSAL BEARING
Filed July 15, 1932
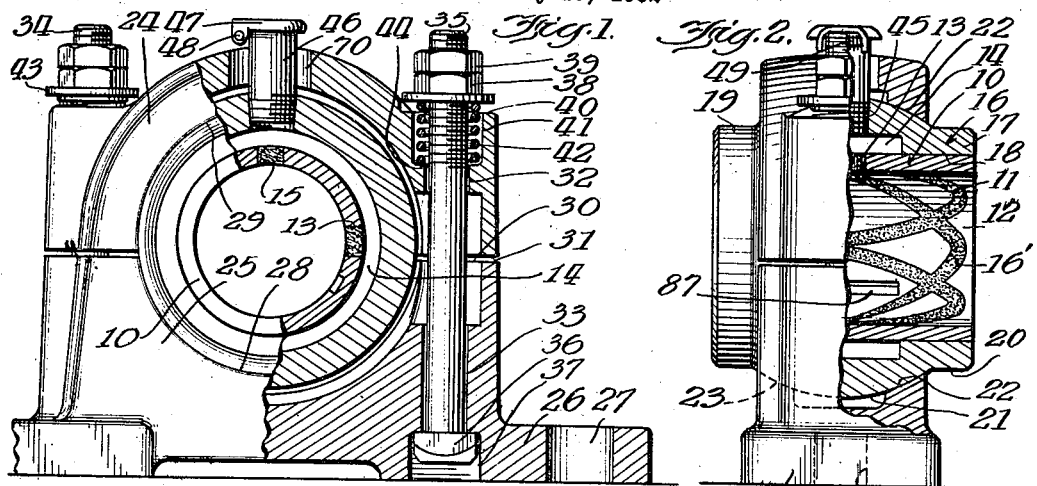
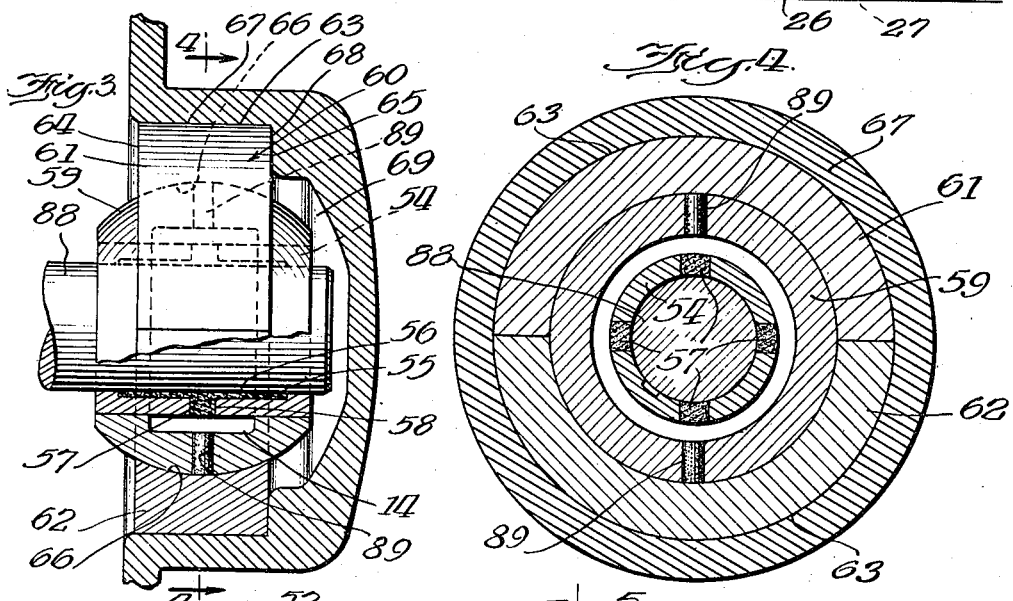
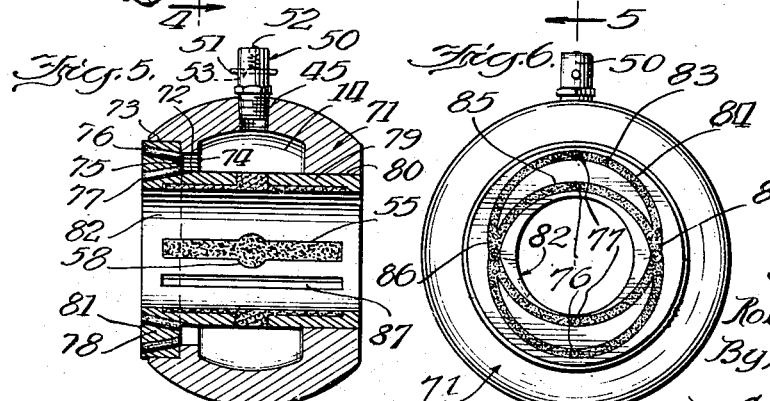
Inventor:
Robert H. Whiteley
By Williams, Bradbury,
McCaleb & Hinkle
Attys.

Patented July 28, 1936

2,048,763

UNITED STATES PATENT OFFICE 2,048,763

SELF-LUBRICATING UNIVERSAL BEARING

Robert H. Whiteley, Oak Park, Ill., assignor to Robert H. Whiteley, trustee

Application July 15, 1932, Serial No. 622,599

4 Claims. (Cl. 308—125)

The present invention relates to self-lubricating bearings and is particularly concerned with self-lubricating bearings of the type which are self-aligning or capable of universal movement. The particular bearings involved in the present application are peculiarly adapted to be used as replacements for self-aligning ball bearings, and at the present time a very wide field of application has been found for self-lubricating bearings of this type in air conditioning and cooling equipment.

While the present self-aligning bearings are capable of being used in any place where self-aligning ball bearings would be used, they are of particular advantage in air conditioning equipment for the reason that the air conditioning equipment usually is provided with air shafts for carrying the air to various parts of the house. Difficulties have been experienced with self-aligning ball bearings in this equipment for the reason that the rolling of the balls causes a rumbling sound, which is amplified and transmitted to every part of the house by means of the air shafts.

Wherever self-aligning bearings of the present type have been brought to the attention of manufacturers of air conditioning equipment, they have immediately replaced the more expensive and noisy ball bearings, and devices embodying the present invention have, therefore, become very popular and have met with immediate acceptance by the trade.

One of the objects of the invention is the provision of an improved self-aligning bearing which is adapted to replace or be substituted for self-aligning ball bearings, particularly in air conditioning equipment or television equipment, where lack of noise and vibration is essential.

Another object of the invention is the provision of an improved self-lubricating bearing which is also adapted to be self-aligning so that the bearing may be moved to a limited amount of universal movement and aligned with the shaft or other bearings automatically.

Another object of the invention is the provision of an improved bearing which is adapted to be resiliently secured in position so that it is self-aligning and also adapted to be fixedly secured in position after it has become aligned.

Another object of the invention is the provision of an improved self-aligning self-lubricating bearing, the universal movement of which is limited to a predetermined amount by means of a filling spout or fitting with which the bearing is provided.

Another object of the invention is the provision of an improved self-lubricating bearing having a reservoir of a predetermined shape which is adapted to give the bearing a self-aligning or universal movement characteristic so that the bearing may be utilized in machinery where self-aligning ball bearings were formerly thought necessary, thereby greatly reducing the cost of the machinery.

Another object of the invention is the provision of a plurality of forms of improved self-aligning bearings, including a combined thrust and cylindrical bearing which is provided with a reservoir adapted to supply lubricant for a long period of time without necessity for replenishment.

Another object of the invention is the provision of an improved self-aligning self-lubricating bearing which is heat responsive so that at a predetermined temperature the bearing produces an increased flow of lubricant, thereby preventing further increase in temperature and maintaining the flow of lubricant responsive to any increase in friction or temperature.

Referring to the drawing,

Fig. 1 is an end elevational view in partial section, of a pillow block type of self-aligning self-lubricating bearing constructed according to the present invention;

Fig. 2 is a side elevational view of the same bearing in partial section;

Fig. 3 is a side elevational view in partial section of a modified form of bearing, shown in connection with a bearing socket, and adapted to replace ordinary self-aligning ball bearings at a much lower cost;

Fig. 4 is a sectional view taken on the plane of the line 4—4 of Fig. 3, looking in the direction of the arrows;

Fig. 5 is a transverse sectional view taken through a modified form of bearing which may be utilized in either Fig. 1 or 3, showing a combined thrust and cylindrical bearing constructed according to the present invention;

Fig. 6 is an end elevational view of the bearing shown in Fig. 5, showing the thrust bearing surface.

Referring to Figs. 1 and 2, the bearings constructed according to the present invention preferably utilize a bearing sleeve 10 made of bearing metal such as bearing brass, bronze or the like, which is provided with grooves 11 located on the inner cylindrical bearing surface 12. The grooves 11 may consist of substantially elliptical closed or reentrant grooves which extend longitudinally and transversely across the cylindrical bearing surface from one end of the bearing to the other, and which are so located that a plurality of the loops cross each other so as to make lubricant available to every part of the surface of the bearing 10.

The bearing sleeve 10 is preferably provided with a plurality of apertures 13 extending from the grooves 11 to the rear side of the sleeve 10, the apertures 13 being adapted to communicate with a reservoir 14.

The grooves 11 and apertures 13 are preferably provided with a porous carbon or graphite compound which is initially plastic and which is intruded into the apertures and pressed into the grooves 11 by pressure while in a plastic state. This plastic graphite compound may be purchased upon the open market. When the plastic graphite compound is pressed into the grooves and/or apertures into intimate contact with the metal, the compound takes the shape of the adjacent metal, and it is then baked in place, the baking operation rendering the initially plastic graphite compound solid and porous in such manner that it is adapted to feed lubricant continuously in very small quantities to the bearing surface. The porous graphite compound passes lubricant more readily as the lubricant becomes thinner and less viscous and, therefore, whenever the bearing surface requires additional lubrication, so that the bearing surface becomes warm, there is an additional flow of lubricant through the graphite plugs 15 and the graphite distributing members 16' located in the grooves 11.

The bearing is preferably also provided with lubricant of a type adapted to melt at a predetermined temperature, and I have found it particularly efficacious to utilize petroleum jelly for the lubricant because petroleum jelly melts at a predetermined temperature, which is only slightly above the ordinary room temperature. Petroleum jelly is solid at ordinary room temperatures, and therefore lubricant does not flow until the bearing has become heated to the predetermined melting temperature.

The walls of the reservoir 14 are in heat conducting relation with the bearing sleeve 10 and the bearing surface 12 so that the heat generated in the bearing surface is transmitted to the solidified lubricant in the reservoir 14.
The temperature at which the lubricant melts may be accurately predetermined by mixing relatively solid lubricating material with liquid or viscous lubricating material, and I do not wish to be limited to any particular temperature or range of temperatures. The lubricant composition which is given herein is merely exemplary of one of the predetermined temperatures for one particular purpose, and practically any desired temperature may be attained within the range of a melting temperature of solidified lubricating material.

For instance, water pumps of a particular type may run at a temperature of about 160 to 180° F. at the bearings. One form of lubricant for melting at a predetermined temperature may consist of a mixture of 50% of petrolatum by volume, with 50% of ordinary cylinder oil, such as Polarine, which has a viscosity of 175 at 180° F. Ordinary petrolatum is solid below 132° F., and it begins to melt at about 128° F. Such a mixture of lubricants is substantially solid at temperatures below the melting temperature of the mixture, but the mixture may liquefy at a temperature of about 128° F., and as soon as the pump bearing has reached this predetermined temperature, the flow of lubricant begins.

For example, in air conditioning equipment the solidified lubricant should melt at a substantially lower temperature, or liquid lubricant could be used. In any event, the present bearing is adapted to provide an increased flow of the lubricant under any conditions so that there is absolutely no danger of the bearing becoming hot due to lack of lubricant because the heating of the bearing inevitably causes the flow of lubricant.

The bearing being heat responsive, the expansion of the gases and/or lubricant in the reservoir 14 with the further thinning action of heat on the lubricant, causes an increased flow of lubricant with an increase in temperature, and while the present bearing is capable of operating for years without replenishment of the lubricant, the bearing surface is always constantly supplied with just enough lubricant to maintain the desired oil film, and the action of the graphite also aids in assuring adequate lubrication.

The present bearing may take a number of different forms.

Referring to Figs. 1 and 2, the bearing sleeve 10 comprises a substantially cylindrical tubular member. The bearing sleeve 10 preferably has a pressed frictional fit inside the reservoir casing 16 which is provided with inwardly extending radial flanges 17 having cylindrical surfaces 18 adapted to fit the bearing sleeve 10 very closely. If desired, the reservoir casing 16 may be heated before placing it upon the bearing sleeve 10, or the bearing sleeve 10 may be suitably cooled and contracted before being pressed into the reservoir casing 16.

The reservoir casing 16 is provided with a circumferentially extending groove preferably located midway between its ends on the inside, forming a reservoir 14 in connection with the sleeve 10.

The outside of the reservoir casing 16 may be substantially cylindrical at 19 and 20 adjacent each end, but the major portion of the outer surface of the reservoir casing 16 is preferably provided with a spherical surface 21. This spherical or ball shaped surface is substantially complementary to the partially spherical surfaces 22, 23 located at each side of each end of each of the pillow blocks 24, 25. In other words, the pillow blocks are provided with annular surfaces 22, 23 at each end, the annular surfaces comprising grooves substantially circular in cross section and complementary to the spherical surface 21 on the outside of the reservoir casing.

The spherical surfaces 22, 23 on the pillow blocks do not completely cover the ball formation 21 on the bearing reservoir, and therefore the ball 21 is adapted to rotate in the spherical socket 22, 23 of the pillow blocks 24, 25. The bearing sleeve 10 and reservoir casing 16 may, therefore, take any of a multiplicity of different positions, due to their universal movement in the pillow blocks, and the present bearing is adapted to replace ordinary self-aligning ball bearings at a much lower expense.

The lower pillow block 25 comprises a metal member which is formed with laterally projecting attaching flanges 26, having holes 27 for receiving the screw bolts which are used to attach the lower pillow block in place. The pillow block is provided with partially spherical surfaces 22, 23 and has a semi-circular aperture 28 which cooperates with another semi-circular aperture

29 on the upper pillow block 24 to form a circular aperture of larger size than the cylindrical end portion 19 or 20 of the reservoir casing. The reservoir casing projects from the pillow blocks at each end.

The pillow blocks are provided with flat surfaces 30, 31 which cooperate with each other to permit the pillow blocks to be clamped closer together, if desired, and the pillow blocks are provided with transverse apertures 32, 33 adapted to receive the bolts 34, 35 which clamp the pillow blocks together. Bolts 34, 35 are preferably provided with non-circular heads 36 adapted to be received in non-circular sockets 37 so that the bolt is held against rotation when the nut 38 or lock nut 39 is turned. The upper pillow block is of substantially the same shape as the lower pillow block, except that it has no attaching flanges, and it is provided with substantially flat surfaces 40 surrounding the counterbore 41 which communicates with the bore 32. The counterbore 41 is adapted to receive a helical coil spring 42 surrounding the bolt 35 in the counterbore 41 and the bolt is preferably provided with a washer 43, forming a seat for the upper end of the coil spring 42. The lower end of the coil spring 42 rests against an annular shoulder 44 at the end of counterbore 41.

The reservoir 14 may be filled by immersing the sleeve 10 and reservoir casing 16 in oil during their assembly or by filling the reservoir 14 with hard lubricant prior to its assembly with the sleeve 10. The reservoir is preferably provided with a threaded bore 45 located in the ball surface 21 at one side and adapted to receive the threaded end of a tubular metal member 46. Where the bearing is utilized with the tubular member 46 in substantially upright position, it may be provided with a spring pressed cap 47 rotatably mounted on a pin 48, which is carried by one side of a tubular member 46. A spring 49 about the pin 48 urges the cap 47 into closed position, and the cap 47 prevents foreign material from entering the tubular filling spout 46.

In other embodiments of the invention, such as that shown in Fig. 5 or 6, the threaded bore 45 may be provided with a regular pin fitting 50 having a transversely extending pin 51 for engaging a coupler, and having a ball valve 52 which is urged into closed position by a coil spring 53. The pin fitting 50 is adapted to permit the application of lubricant under pressure, and to maintain the pressure which might be generated by heat in the reservoir 14.

Referring to Figs. 3 and 4, this is a modified form of bearing in which the bearing sleeve 54 may be of substantially the same type, except that it is slightly shorter and is provided with longitudinally extending grooves 55 filled with solid porous graphite compound 56. The grooves 55 communicate with reservoir 14 through the graphite plugs 57 located in the apertures 58. The reservoir casing 59 of this bearing is of substantially the same shape as that previously described except that it does not have the longitudinally projecting cylindrical formations at each end in order to save the space and make the bearing shorter.

This bearing is provided with a supporting ring 60 which may consist of the similar halves 61, 62 of metal, such as steel, having an outside shape and size similar to the outer race for self-aligning ball bearings. In other words, each of the halves 61, 62 is provided with a half cylindrical outer surface 63 and with a flat annular end surface 64, 65. Each of the half rings 61, 62 is provided with a partially spherical groove 66, forming half of the outer universal bearing, and comprising a groove which is circular in cross section and complementary to the outer spherical surface of the reservoir casing 59.

The two half rings 61, 62 may be secured together by any suitable fastening means, but are preferably held in place by being located in a cylindrical socket 67 having a flat annular shoulder 68 for engaging the flat end 65 of the ring.

The socket 67 is provided with an enlargement 69 at its base so as to provide ample room within which the shaft and ball may rotate or move universally with respect to the ring 60.

The structure illustrated in Fig. 3 might, for example, form one of the ends of an electric motor casing or a casing for an air cooling or conditioning apparatus, or the like. The reservoir 14 in this case might be filled with lubricant before or during the assembly of the sleeve and reservoir casing or, if desired, the ring 60 may be provided with an appropriate enlarged aperture like the aperture 70 in Fig. 1 surrounding the tubular filling spout 46 and adapted to limit the universal movement of the bearing.

Referring to Figs. 5 and 6, this is a bearing which may be utilized either with the ring 60 or with the pillow blocks 24, 25 previously described. The reservoir casing 71 in this case may be provided with a bore 72 and a counterbore 73 at one end. The wall 74 adjacent the bore 72 is preferably provided with enlarged openings 75 that register with one or more porous graphite plugs 76, 77 which pass through a radially extending flange 78 carried by the bearing sleeve 79. The bearing sleeve 79 fits in the bores 72 and 80, and its radially extending flange 78 fits in the counterbore 73. The bearing sleeve is thus provided with a radially extending thrust bearing surface 81, as well as a cylindrical bearing surface 82.

The cylindrical bearing surface 82 may be provided with grooves and apertures 55, 58, previously described, which are filled with porous carbon or graphite compound adapted to conduct lubricant from the reservoir 14.

Either the ball surface 59, or the socket 66 may be provided with porous graphite filled grooves and/or apertures communicating with a reservoir.

In the same way, the graphite plugs 76, 77 are adapted to conduct lubricant from the reservoir 14 through the apertures 74 to the porous graphite compound 83 in the grooves 84, 85 on the thrust bearing surface 81.

The grooves 84, 85 may consist of grooves which are circular in elevation in Fig. 6, but which are cut or otherwise formed with different centers, thus making one of the circular grooves eccentric with respect to the other and causing the grooves to intersect at the points 86. The graphite plugs 76, 77 are preferably located in apertures at regularly spaced intervals about the circular graphite groove fillings 83, and it will be noted that the eccentrically located graphite grooves traverse from the inner part of the thrust bearing surface 81 to the outer part of the thrust bearing surface 81. The porous graphite is thus adapted to distribute the lubricant over all of the thrust surface 81, as the rotating part engages the thrust bearing surface.

Any or all of the bearing sleeves described may be provided with one or more longitudinally extending open grooves 87 cut in the side wall of the bearing for the purpose of preventing damage to the graphite filling or other parts of the bearing by any foreign matter or metal which might find its way into the bearing or which may be in the lubricant. The groove 87 thus provides the bearing with a self-cleaning feature, and the bearing is adapted to automatically dispose of any foreign matter without possibility of damage to the bearing surface, such as scoring, which would otherwise occur.

The operation of the present bearings is as follows: The present bearings are adapted to take the place of self-aligning ball bearings, and may be made of suitable form, as shown in Figs. 3 and 4, so that the outer bearing ring fits in the race of the outer face of the self-aligning ball bearing.

Under these conditions, shown in Figs. 3 and 4, the ball 21 is permitted to move universally in the ring 60, while the shaft 88 rotates in the bearing sleeve 54. The bearing sleeve 54 is automatically aligned by the position of the shaft 88, and the bearing is thus self-aligning. If desired, the reservoir casing 59 in any of the present bearings may also be provided with transverse apertures 89, filled with porous graphite plugs adapted to conduct lubricant from the reservoir to the substantially cylindrical bearing surface 66 or to the cylindrical bearing surfaces on the pillow blocks.

The type of combined thrust and cylindrical bearing shown in Fig. 5 is not only adapted to effect its own alignment by virtue of the universal movement of the ball in the outer ring or pillow blocks, but it is also adapted to resist thrust by virtue of the thrust bearing surface at its end.

Referring to Figs. 1 and 2, these bearings are adapted to operate substantially as described, and the partially spherical bearing reservoir is adapted to move universally between the pillow blocks 24, 25. With the nuts 38, 39 adjusted to the position shown in Fig. 1 or 2, the upper pillow block 24 is resiliently urged toward the lower pillow block 25, and the ball 22 is resiliently clamped in predetermined position, but the washer 43 permits only a limited amount of movement determined by the space between the washer 43 and the flat surface 40. The upper pillow block 24 cannot, therefore, jump out of place, as its movement is definitely limited.

In other cases, the spring 42 may be compressed to such a point that it is no longer solely effective to urge the pillow block 24 into place, as the washer 43 may be brought into fixed engagement with the flat surface 40.

The spring pressure may be made such that on account of the differential of friction the ball will not rotate, but will permit universal movement.

Under these conditions, with the nuts 38, 39 threaded home until the blocks fixedly clamp the ball 22, the bearing sleeve 10 will be held fixed in the predetermined adjusted position which it first assumes. This arrangement is adapted to be used to effect an alignment between the respective bearings for a common shaft without any difficulty and to hold the bearings in the predetermined alignment after adjustment.

It will be evident, therefore, that the pillow block arrangement of Figs. 1 and 2 may be utilized to effect a permanent adjustment and fixed alignment of the bearings, or they may be utilized to permit a constant universal movement so that the bearings are self-aligning at all times. The filling spout 46 or pin fitting 50 is adapted to be used to definitely limit the movement of the universal bearing within the pillow blocks or supporting ring, and the spout or fitting is thus adapted to keep the bearing in proper position for assembly with other parts.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a self-lubricating bearing, the combination of a bearing sleeve with an auxiliary metal member engaging outside said bearing sleeve and forming a reservoir, a plurality of porous graphite lubricant conducting members extending through said sleeve from said reservoir and adapted to conduct lubricant from said reservoir to the bearing surface, and a longitudinally extending open groove in said bearing surface of said sleeve provided with sharp edges adapted to clean a rotating shaft and to receive foreign material which may enter said bearing, and preventing scoring of the shaft and bearings by said material.

2. In a self-lubricating bearing, the combination of a bearing shell having a cylindrical bore passing through the same, said shell being provided with a radially extending flange provided with a thrust bearing surface, a plurality of longitudinally extending grooves formed in the bore of said shell and extending parallel to the axis thereof, said shell having apertures extending from said grooves to the outside of said shell, and said radial flange having diagonally extending apertures extending through the same, a porous carbon composition filling said grooves and apertures, and adapted to conduct lubricant from a lubricant reservoir to the cylindrical and thrust bearing surfaces, an outer housing member having a spherical surface and formed with a pair of inwardly extending annular flanges, one of said flanges engaging said shell, and the other of said flanges engaging behind said radial flange, said outer housing being formed with a counterbore for receiving said radial flange and forming with said shell a reservoir for receiving lubricant, and a pressure supply fitting connected to said reservoir and adapted to supply lubricant under pressure to said reservoir.

3. In a self-lubricating bearing, the combination of a bearing shell having a cylindrical bore passing through the same, said shell being provided with a radially extending flange provided with a thrust bearing surface, a plurality of longitudinally extending grooves formed in the bore of said shell and extending parallel to the axis thereof, said shell having apertures extending from said grooves to the outside of said shell, and said radial flange having diagonally extending apertures extending through the same, a porous carbon composition filling said grooves and apertures, and adapted to conduct lubricant from a lubricant reservoir to the cylindrical and thrust bearing surfaces, an outer housing member having a spherical surface and formed with a pair of inwardly extending annular flanges, one of said flanges engaging said shell, and the other of said flanges engaging behind said radial flange, said outer housing being formed with a counterbore for receiving said radial flange and forming with said shell a reservoir for receiving lubricant, and a pressure supply fitting connected to said reservoir and adapted to supply lubricant under pressure to said reservoir, said thrust bearing surface being formed with a plurality of grooves circular in plan, and said grooves being arranged eccentrically with respect to each other, whereby the grooves cross each other and extend from the inner part of said thrust bearing surface to the outer part, and porous carbon compound in said latter grooves.

4. In a self-lubricating universal bearing a combination of a bearing member adapted to form one wall of a reservoir and provided with a plurality of grooves on its bearing surface, said bearing member having apertures extending from said grooves into said reservoir, with a porous graphite compound filling said grooves and apertures and adapted to conduct lubricant from said reservoir to said bearing surface, a second bearing member having a circumferentially extending groove on its interior and having a pair of registering bores adapted to receive the first bearing member to form a reservoir therewith, said second bearing member having a partially spherical outer surface, a pair of supporting members adapted when secured together to form a partially spherical socket for receiving the said second bearing member, said second bearing member having a limited universal movement in said supporting members, said second bearing member being provided with a conduit extending to said outer partially spherical surface from said reservoir, and a porous graphite compound filling said latter conduit for conducting lubricant to sail partially spherical bearing surface.

ROBERT H. WHITELEY.